United States Patent

[11] 3,536,235

| [72] | Inventors | William T. Holzhauer<br>Basking Ridge;<br>Howard M. Siegel, Livingston, N.J., and<br>Webster H. Padgett, Baton Rouge,<br>Louisiana |
|---|---|---|
| [21] | Appl. No. | 733,752 |
| [22] | Filed | June 3, 1968 |
| [45] | Patented | Oct. 27, 1970 |
| [73] | Assignee | Esso Research and Engineering Company<br>a corporation of Delaware |

[54] VOLUMETRIC METERING DEVICE FOR PARTICULATE SOLIDS
7 Claims, 9 Drawing Figs.

[52] U.S. Cl. ........................................................ 222/273, 222/368
[51] Int. Cl. ........................................................ G01f 11/00
[50] Field of Search ........................................... 222/273, 363, 368, 353

[56] References Cited
UNITED STATES PATENTS

| 1,069,527 | 8/1913 | Carman ........................ | 222/273 |
| 1,369,968 | 3/1921 | Draver ......................... | 222/273 |
| 1,997,791 | 4/1935 | Hoberg et al. ................ | 222/273 |
| 3,052,383 | 9/1962 | Transeau ...................... | 222/368X |

Primary Examiner—Stanley H. Tollberg
Attorney—Manahan and Wright and Llewellyn A. Proctor ABSTRACT: This invention relates to improved volumetric metering apparatus for introducing particulate abrasive solids to pressurized systems, including those operated at elevated temperatures, e.g., fluidized iron ore reduction reactors. The apparatus comprises the general combination of a rotatable drum or paddle wheel journaled within an enclosing housing, the pressure of which is equilibrated with that of the reactor. A plurality of individually spaced blades extend perpendicularly from the drum surface, and side walls which extend at least to the terminal ends of the blades provides individual recesses for solids. Solids gravitate from an inlet into the drum to fill individual recesses, in seriatum, as the drum is rotated, and solids are discharged through an outlet to the reactor. In the operation, individual drum recesses are filled to a depth up to an angle of repose of the solids. Improved continuity of solids flow, without substantial overflow, is attained by maintaining a skewed relationship between the solids inlet and the recesses so that individual recesses are simultaneously filled from different sections of the inlet. In a particularly preferred combination there is provided, inter alia, a triangular shaped inlet and a plurality of recesses, preferably three recesses, which lie in the path of solids flow from the inlet.

Patented Oct. 27, 1970 3,536,235

W. T. HOLZHAUER
H. M. SIEGEL          Inventors
W. H. PADGETT

BY

PATENT ATTORNEY

Patented Oct. 27, 1970

W. T. HOLZHAUER
H. M. SIEGEL    Inventors
W. H. PADGETT

BY

Llewellyn A. Proctor

PATENT ATTORNEY

Patented Oct. 27, 1970

3,536,235

Sheet __4__ of 5

W. T. HOLZHAUER
H. M. SIEGEL   Inventors
W. H. PADGETT

BY

PATENT ATTORNEY

Patented Oct. 27, 1970

W. T. HOLZHAUER
H. M. SIEGEL    Inventors
W. H. PADGETT

BY

PATENT ATTORNEY

VOLUMETRIC METERING DEVICE FOR PARTICULATE SOLIDS

Various systems are known wherein it is desirable or essential to introduce very finely divided abrasive solids particles for further processing. In a fluidized iron ore reduction reactor, e.g., it is essential to meter particulate iron ore into a reactor in volumetric quantities to maintain proper processing conditions. In such reactors, finely divided iron ore, e.g., oxidic iron ore, must be elevated to the top of a reactor, introduced into the upper stage of a series wherein the ore is countercurrently contacted in individual beds by ascending fluidizing reducing gases. The individual beds are generally maintained at supraatmospheric pressures ranging, e.g., from about 100 to about 200 pounds per square inch absolute and above and at elevated temperatures ranging generally from about 1,000°F. to about 1,8000°F. and higher. The ore is progressively reduced upon descent from one stage of the series to the next to provide substantially metallic iron which is withdrawn from the final ferrous reduction stage.

Presently available apparatus is generally unacceptable for such usage. This is because of the requirement of operating at relatively high temperature and pressures, and the demand for continuous, uninterrupted constant feed volumes which impose heavy burdens. A major factor is due to the high wear caused by the abrasive action of the finely divided ore. Solids pack into close clearances and jam the feeders. Seals and bearings, in particular, are exposed to the abrasive action of the solids. The pressure of the gas forces ore solids into, e.g., the bearing shaft which disrupts the proper operation and damages the apparatus.

These problems have been overcome in part by the improved volumetric metering apparatus described in U.S. Pat. No. 3,455,490. While this apparatus has proven generally satisfactory, certain problems yet remain when attempts are made to feed very finely divided ores into a reactor.

Ores containing substantial amounts of very finely divided particles relative to the total particle size distribution are very difficult to feed. For example, it has been found that an ore, at least 90 percent of the particles of which are smaller than 8 mesh (Tyler Series) and as much as about 20 percent are as small as about 325 mesh, will feed only with difficulty. Ores of relatively smaller particle size distributions are even more difficult to feed, and the magnitude of difficulty increases relative to the degree of ore fineness. One problem is that the ore discharges from the inlet in spurts. Another problem is that the flow is not uniform across the cross-sectional area of the inlet, and another is that, despite the close clearance, the solids become fluidized and overflow the recesses.

The reasons for this problem with very fine ores are not fully understood. It is postulated, however, that the solids within the inlet tend to arc over at frequent intervals to create voids. The stability of the ore is intermittently broken thus creating pulsating solids flow. Another theory relates to pressure fluctuations within the inlet. Pressure builds up within the inlet causing periodic gas flow outwardly through the clearances, fluidizing the solids and causing the solids to overflow the recesses. Conversely, inward gas flow fluidizes solids within the inlet so that the solids flow into and overflow the recesses. Whatever the complete explanation, however, the solids do become fluidized and overflow the recesses.

It is accordingly the primary objective of the present invention to obviate these and other difficulties. It is, specifically, an objective to accomplish these ends and to provide a volumetric metering device for introducing finely divided solids, especially abrasive solids, into various systems. In particular, it is an objective to provide particulate solids metering apparatus wherein there are no close clearances for binding between the component parts so as to cause wear, and no solids holdup in the pressure vessel in which the solids are introduced.

These and other objects are achieved in accordance with the present invention comprising, in combination, an enclosing wall defining a housing within which is journaled a rotatable drum containing recesses or pockets for conveying solids between a solids inlet located above the drum to a solids outlet located below the drum. In a preferred combination, particulate solids can be delivered to a pressurized system and the pressure between the housing and the pressurized system is equalized by use of a connecting line or conduit. The drum is a cylindrical shaped member, and its curved external surface is provided with a series of blades or vanes of generally rectangular shape which extend or project radially and preferably equidistantly outwardly from the drum surface. To each flat side of the drum, facing inwardly, is affixed circular shaped members forming walls which extent outwardly to the upper edges of the individual blades to form, with the blades, a series of rectangular shaped, troughlike, constant volume receptacles. Preferably, the blades are of equal size and spaced equidistant one from another along the curved drum surface. Solids pour from the inlet into the individual recesses. These are filled in seriatum, and the solids are conveyed from the inlet for feeding or metering through the outlet. Thus, in effect, solids pour from the inlet to the recesses which are successively filled as the drum is rotated via suitable means and, due to constant angular velocity of rotation, solids are delivered to a system at constant rate.

A feature of the invention is that the distance between the open end or terminus of the solids inlet and receptacle or pocket on the drum surface is sufficiently close to the drum surface for solids to pour into an aligned recess to fill it up to the angle of repose of the solids. If the distance is too great, particulate solids will overflow or spill from the recesses, this causing incipient fluidization of the particulate solids. Under this condition of operation, the flow of solids will be erratic or the solids will not feed.

To further reduce incipient fluidization it has often been found desirable to operate such that the distance between the terminus of the solids inlet and a receptacle or pocket is less than the diameter of the largest particles of the ore. The momentum of the revolving drum is sufficient to pulverize oversized particles of oxidic iron ores, at least where no more than about 25 weight percent, or more preferably no more than about 20 weight percent, of the particles of the ore mixture exceed the provided clearance. Oxidic iron ores containing, e.g., about 10 weight percent oversized particles ranging from about one-fourth to about one-half inch in diameter are readily processed. In those instances where the ores or other material to be processed are too highly abrasive, it may be desirable to provide a distance between the terminus of the solids inlet and a receptacle which is greater than the maximum particle diameter of the solids. Such distance ranges, preferably, no more than about 4 times the diameter of the largest solids particle.

A clearance is provided which is just sufficient to cause the ore to completely fill an aligned receptacle, but insufficient to provide an angle which will exceed the angle of repose of the solids. For oxidic iron ores, the distance is such that ore will pour into the recesses and fill them up to the angle of repose, this representing generally an angle ranging from about 30 to about 40°, and more generally from about 35 to about 40°.

In an especially preferred embodiment, improved continuity of solids flow, without substantial overflow, is provided by maintaining a skewed relationship between the solids inlet and the individual recesses so that the latter can be simultaneously filled from different sections of the inlet. In a preferred combination a plurality of recesses, rather than single full-width recesses, are provided across the width of the drum. This configuration, with an inlet of triangular cross section, provides more uniform and continuous solids flow. Moreover, a curved plate at the terminal end of the inlet maintains the required clearance between the inlet and the blade edges. This also aids in minimizing the tendency of the fluidized solids to flow under the edge of the inlet, or over the top of the blade edges.

The distance between the outer surfaces of the side walls defining the drum and the inside walls defining the housing within which the drum turns is also greater than the maximum diameter of the largest particle to prevent abrasion. Preferably, this distance also ranges up to about 4 times the maximum particle diameter. In the combination, abrasion is also drastically reduced by a design which eliminates immersion of the drum within the abrasive solids. The packing glands and bearings also are located outside the housing walls and, because the pressure between the housing and the reactor is equalized, there is little or no tendency of the particulate solids to flow into the parts within which the drum is journaled.

These and other features, and advantages, will be understood by reference to the following detailed description, and to the drawings to which reference is made in the description.

Figure 1:
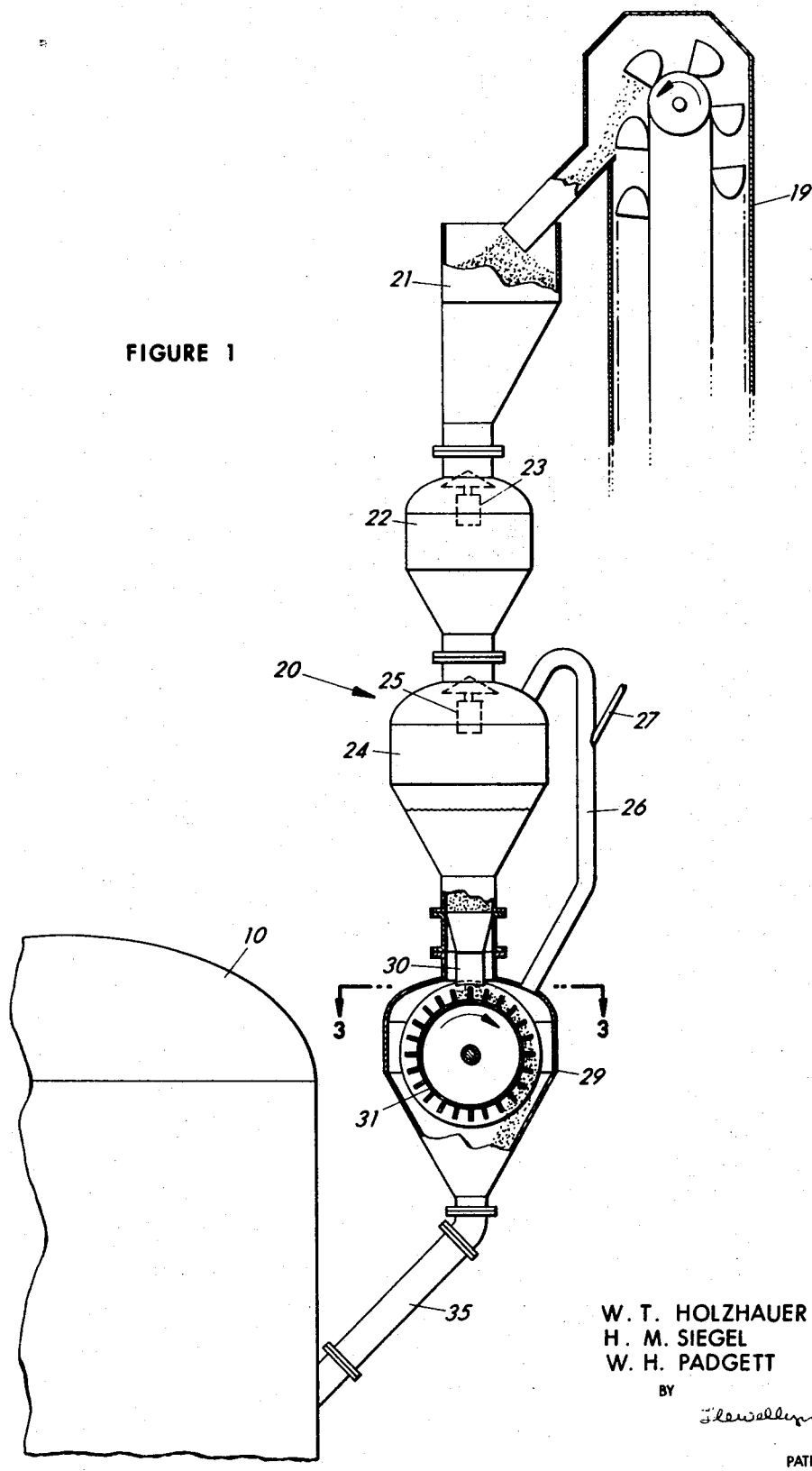
FIG. 1 is a side elevation view of a preferred drum volumetric metering device, especially of an embodiment or drum-housing combination for metering particulate iron ore solids into a pressurized reactor.

Referring to FIG. 1 is shown generally a reactor 10 and a volumetric metering system 20 for introducing particulate iron ore solids to the reactor. Ore is conveyed to the top of reactor 10, e.g., via a bucket elevator 19 and introduced to reactor 10 via the volumetric metering system 20.

The reactor 10 provides a series of fluidized beds or stages, the upper or first of which is often a low-temperature preheat stage wherein little or no reduction takes place. Often, also, gases are combusted within this stage to provide process heat. In any event, ore is introduced into the first stage and flowed downwardly from one stage to the next via standpipes (not shown), and within the individual fluidized beds the ore is progressively reduced from, e.g., ferric oxide to magnetic oxide of iron, thence to ferrous oxide, and finally to substantially metallic iron. Reducing gas is introduced into the bottom of reactor 10 with makeup gas or regenerated gas, or both, as desired.

A preferred volumetric metering system for feeding ore at substantially atmospheric pressure comprises a series of hoppers 21, 22, 24, 29, interconnected one to another via suitable flange connections. Ore is introduced at substantially atmospheric pressure into an open hopper 21. Ore from hopper 21 is discharged via suitable valve means 23 to the connecting closed hopper 22, which can be pressurized. Ore from hopper 22 is introduced via suitable valve means 25 into the pressurized connecting hopper 24. The pressure within hopper 24 is maintained in equilibrium with hopper 29 and reactor 10 by virtue of an open line or equilibrium line 26 which connects hopper 24 with the drum metering device 29. The latter hopper 29 is, in turn, maintained at the pressure of reactor 10 via use of an oversized line 35 which also serves as a conduit for introduction of the ore into the reactor. A purge line 27 is provided in line 26 to prevent blockage by solids.

In operation, particulate ore at atmospheric pressure pours from hopper 21 into the hopper 22 via valve 23, and thence is discharged to hopper 24 via valve 25. The pressure within hopper 22 varies between atmospheric and reactor pressure, while the latter hopper 24 (and hopper 29), as indicated, is maintained at reactor pressure.

Figure 2:
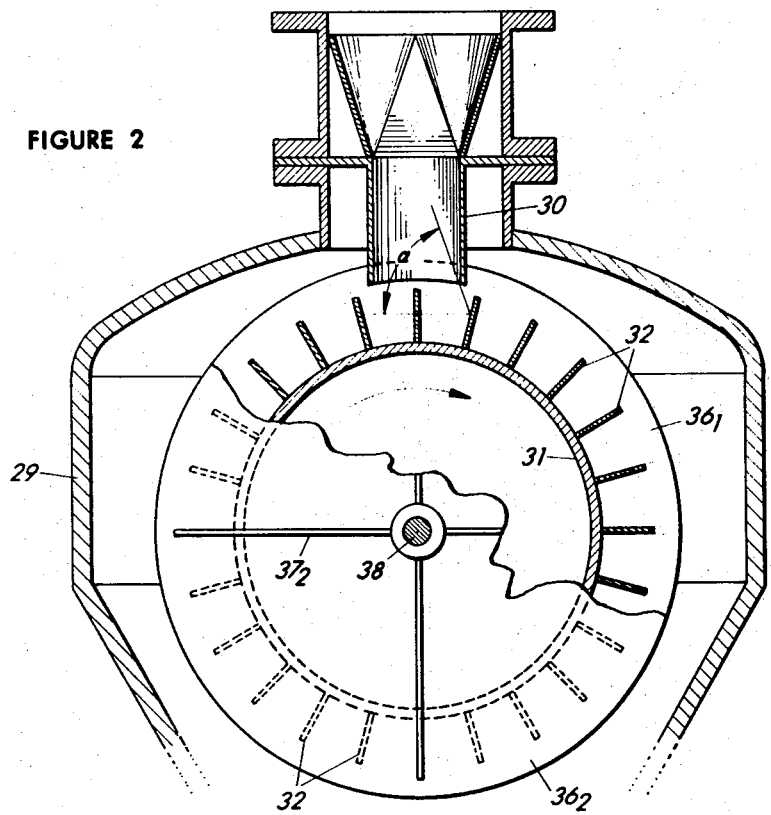
FIG. 2 is an enlarged fragmentary view taken from the foregoing FIG. showing the critical dimension between the terminal open end of the ore inlet and blade edges (or path thereof) located or mounted upon the drum surface.

The ore within hopper 24 is maintained at a suitable level and is metered into reactor 10 by rotation of wheel 31 via suitable motor means 36. Ore pours through the ore inlet or chute 30 onto the drum surface and into a recess located below the inlet. It will be observed, particularly by reference to FIG. 2, that the individual (relatively shallow) recesses between any pair of blades 31 are sequentially filled with ore up to a certain critical level which is less than or equal to the angle of repose of the particular solids. Thus, a distance is provided between the upper edges of the blades 32 and the terminal end of the chute 30 so that the angle of repose of the piled solids is never exceeded. In the preferred operation, as an empty recess moves into filling position below chute 30, ore begins to flow into the recess. The flow continues, the angle $\alpha$ between a line along the surface of the pile and horizontal gradually increasing until the angle is equal to the angle of repose of the solids. The flow then ceases. Thus, distance between the drum 31 is such that the blades 32 extend sufficiently far outwardly that solids cannot overflow the edges of the blades as the angle of repose is reached. The flow into a recess therefore must cease. For rapid filling, the recesses or pockets should be of greater width in the direction lying parallel to the axis of the drum 31 than in the direction perpendicular thereto. The dimensions of the ore inlet or chute 30 preferably also conform to this configuration.

A feature of this design also is that the power requirements are very low. Thus, as ore fills the recesses of the rotating drum 31 the weight of the solids tends to produce or continue the rotation which feeds the solids to the outlet 35. The drum 31 is thus activated by the solids much as a water wheel used for power generation.

In its preferred form also, the equipment is sized so that drum 31 is rotated, preferably at angular velocities which provide peripheral velocities ranging up to about 100 inches per minute, the angular velocities ranging from about 1 to about 30 revolutions per minute, and preferably from about 1 to about 4 revolutions per minute. In accordance therewith, incipient fluidization is minimized.

Figure 3:
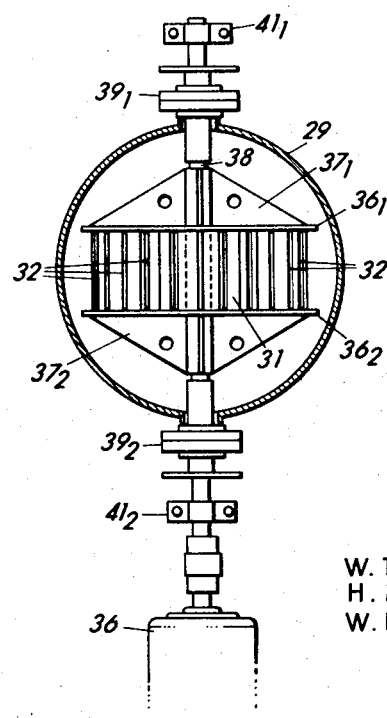
FIG. 3 is a plan view or section showing the drum and lower drum housing, showing especially the location of the packing glands and bearing supports outside the housing, as well as the spacing between the outer surfaces of the drum and the inner walls of the housing.

The drum 31 is mounted on an axle 38, of relatively long length, journaled within and extending through the surrounding walls forming the hopper 29 (FIG. 3). Stiffening members $37_1$, $37_2$ are provided to aid in the support of the axle 38, these being affixed to the walls $36_1$, $36_2$ which turn with and are a part of the drum 31. Packing glands $39_1$, $39_2$ are located outside the housing, and the axle 38 is supported on bearing supports $41_1$, $41_2$. The drum 31 is rotated on the axle 38 via motor means 36.

It will be observed that considerable space is provided between the rotating drum 31 and the walls of hopper 29. Clearances are provided which are greater than the maximum particle size of the solids. Spilled solids flow downwardly along the side walls of hopper 29 to enter the outlet 35. Thus, a feature of the design is that drum 31 is never immersed in solids.

In processing ores of very fine particle size distributions, it has been found very desirable to maintain a relatively skewed relationship between the inlet chute and the individual recesses across the width of the drum. Thus, in use of a rectangular shaped inlet chute it has been found that ore flows primarily from the trailing edge of the chute, little or no ore flowing from the leading edge. ore is literally dumped into a recess upon exposure. Conversely, it has been found that ore flows primarily down the leading two sides, (or near the forward corners), and within the leading corner, of an inlet chute of triangular cross section. These configurations can be arranged to separate the primary flow areas of an inlet chute so that each feeds into different individual recesses separated one from another by time of discharge. Specifically, such chute configurations are skewed relative to the individual recesses, or vice versa, as will be described by references to FIGS. 4 through 8.

Figure 4:
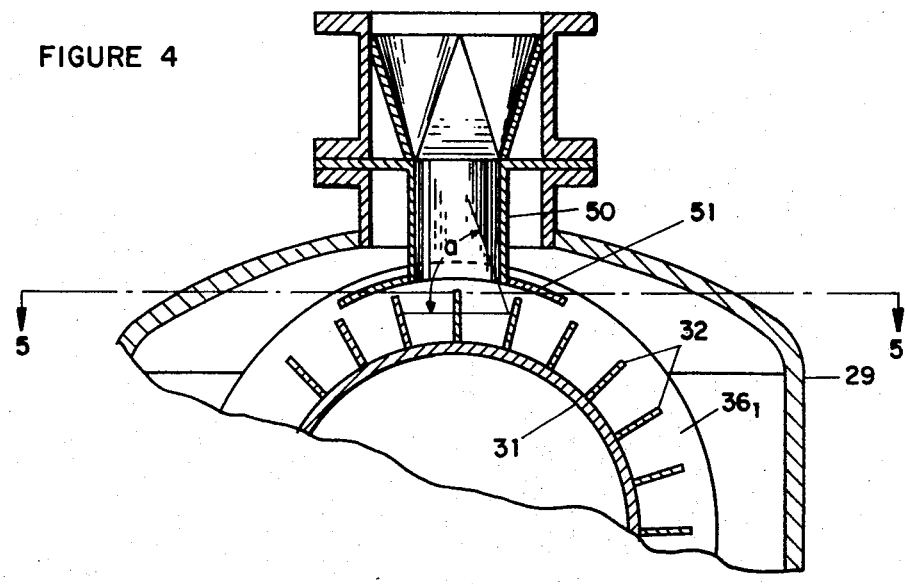
FIG. 4 is an enlarged fragmentary view, generally similar to FIG. 2, except that this FIG. depicts the substitution of an ore inlet of triangular cross section, and the presence of a curved plate shroud or skirt on the terminal end of the inlet.
Figure 5:
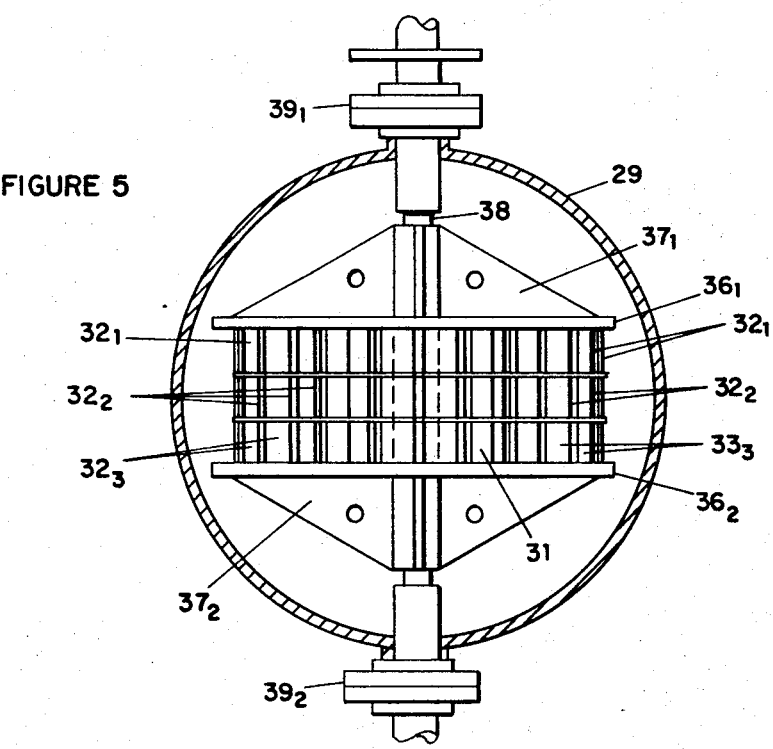
FIG. 5 is a plan view taken along lines 5–5, showing a plurality of recesses across the width of the drum.

Referring to FIGS. 4 and 5, there is shown a hopper 29 provided with a drum 31 which contains a plurality of recesses $32_1$, $32_2$, $32_3$ across the width of the drum. The inlet chute 50 is of triangular cross section. The terminal end thereof is provided with a skirt or shroud 51 which is curved to conform to the general contour of the surface of the drum 31. The clearance between the underneath surface of the shroud 51 at any location is generally equidistant from the path generated by the moving blade edges 32. The shroud 51 minimizes the packing of solids against the leading edge of the inlet 50 and decreases the tendency of fluidized solids to flow under the edge of the inlet 50, or over the top of the blade edges 32. Fluidization and spillage of the solids are decreased.

Figure 6:
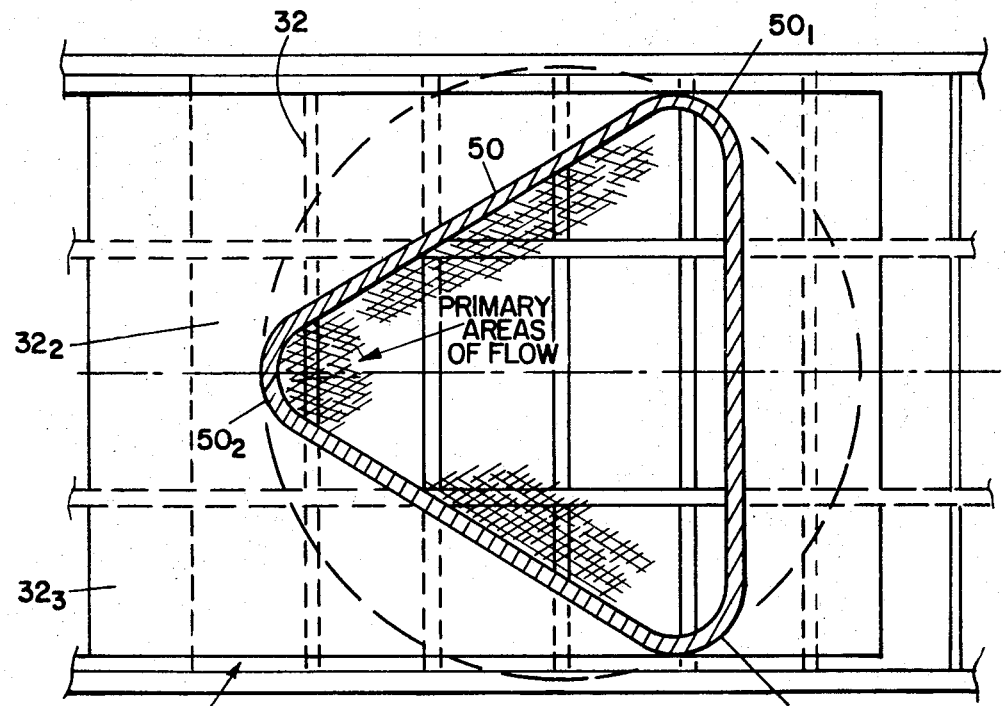
FIGS. 6 and 6A are schematic diagrams illustrating the relationship between the triangular shaped inlet and the recesses, as described in the foregoing FIGS.
Figure 6A:
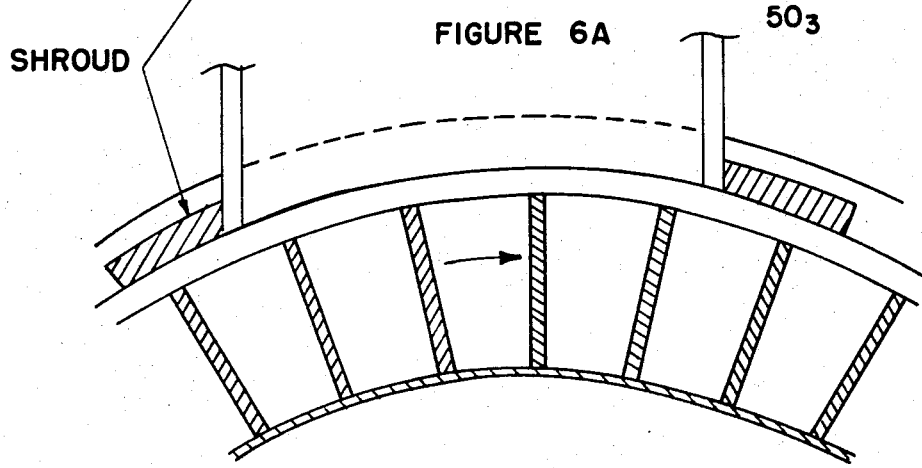

The plurality of recesses $32_1$, $32_2$, $32_3$ in combination with the triangular shaped inlet 50, as best illustrated by reference to FIGS. 6 and 6A, provides a skewed relationship which produces more uniform and continuous solids flow. Solids flow primarily downwardly along the leading edges between angular corners $50_1$ and $50_2$, and $50_2$ and $50_3$, and within corner $50_2$, while relative voids, stagnant, nonmoving or stationary solids remain immediately within the central area and the trailing corners $50_1$, $50_3$ of the triangular shaped chute. By arrangement of a plurality, i.e., three, recesses across the width of the drum 31, better net continuity of flow is approached because discharge of any increment of ore is spread over recesses which are separated one from another as regards their time of discharge through the solids outlet. In other words, an increment, or cross section, of ore is fed into pockets $32_1$, $32_3$ which precede in time $32_2$ which is emptied later through the solids outlet. The greater the time separation of discharge between the individual recesses filled by an increment of ore the closer the approach to a continuous feed and the lesser the effect of pulsating ore discharge from an inlet.

Figure 7:
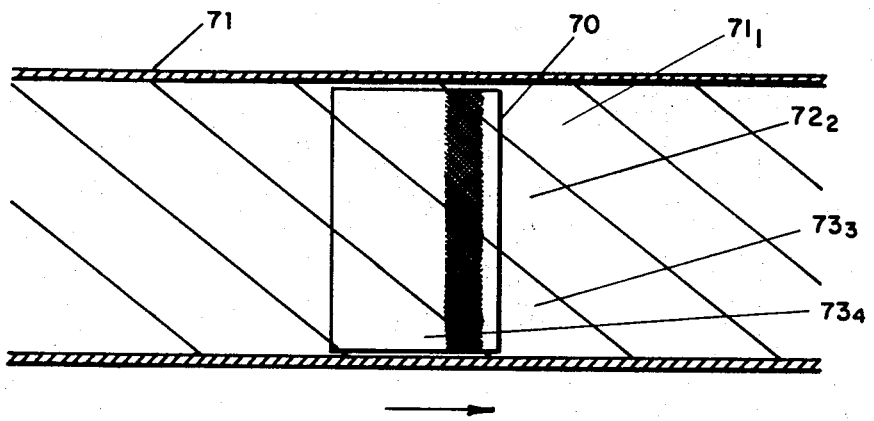
FIGS. 7 and 8 are schematic diagrams illustrating other skewed recess-inlet combinations.
Figure 8:
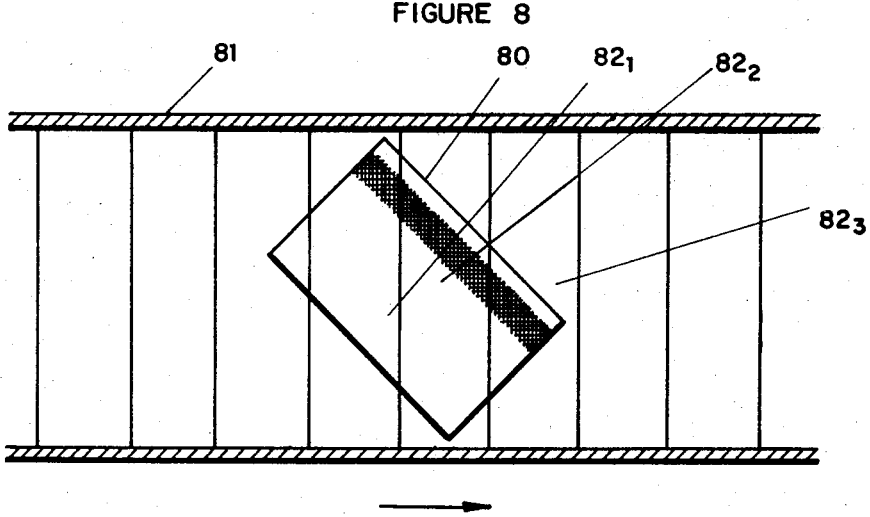

By reference to FIGS. 7 and 8 it is also shown, e.g., how a rectangular chute can be employed to provide the desired skewed effect. By reference to FIG. 7, it is thus shown that, by diagonal spacing of recesses $72_1$, $72_2$, $72_3$, $72_4$ across the width of a drum 71 which is moving in the direction of the arrow, a rectangular inlet chute 70 can be used to disperse an increment of ore between the individual recesses. Moreover, as shown by reference to FIG. 8 wherein the drum is moving in the direction of the arrow, the rectangular inlet chute 80 can be skewed relative the line of movement of drum 81 to fill recesses $82_1$, $82_2$, $82_3$ to disperse an increment of ore.

It is apparent that various modifications and changes can be made without departing the spirit and scope of the invention.

We claim:

1. In apparatus for metering volumetric quantities of particulate oxidic iron ore abrasive solids to a reactor for the fluidization of said particulate abrasive solids by contact with an ascending gas, wherein is included:
   an enclosing wall defining a housing;
   a rotary drum mounted on an axis extending through the housing;
   blades extending perpendicularly from the curved drum surface;
   side walls which extend beyond the drum surface and perpendicular to the outer edges of the blades to form individual recesses for collecting, in seriatim, the solids fed therein as the drum is rotated;
   an inlet extending downwardly from an elevated source for conveying particulate solids to the recesses located in the drum surface;
   the terminus of said inlet being located away from the path of the blades at a distance greater than the maximum particle diameter of about 75 weight percent of the solids to provide sufficient clearance for the passage of the blades on rotation of the drum, but sufficiently close to the blades for solids to pour into an aligned recess for limited filling to a depth up to the angle of repose of the piled solids without overflow from the recess;
   an outlet located below the drum for conveying particulate solids to the reactor; and
   means for rotating the drum to meter solids into the reactor, the improvement comprising
   maintaining the inlets skewed relative to the recesses so that the increment of solids is spread between a plurality of individual recesses separated one from another by time of discharge.

2. The apparatus of claim 1 wherein the inlet is of triangular cross section and a plurality of recesses are provided across the width of the drum.

3. The apparatus of claim 2 wherein at least three recesses are provided across the width of the drum.

4. The apparatus of claim 1 wherein the inlet is of triangular cross section and three recesses are provided across the width of the drum.

5. The apparatus of claim 1 wherein an inlet extending downwardly from an elevated source includes:
   an enclosing wall defining a housing;
   a valve for maintaining an internal pressure and for receiving solids introduced therethrough; and
   a pressure equilibrium line communicating said inlet and said metering apparatus.

6. The apparatus of claim 1 wherein the inlet is of rectangular cross section.

7. The apparatus of claim 1 wherein the inlet is provided with a shroud which generally conforms to the curvature of the drum surface and the underneath surface thereof is substantially equidistant therefrom at any given location.